United States Patent
Liu et al.

(10) Patent No.: US 7,577,324 B2
(45) Date of Patent: Aug. 18, 2009

(54) METHODS TO REDUCE POLARIZATION DEPENDENT LOSS IN PLANAR LIGHTWAVE CIRCUITS

(75) Inventors: Alice Liu, San Jose, CA (US); Pamela Shiell Trammel, San Jose, CA (US)

(73) Assignee: NeoPhotonics Corporation, San Jose, CA (US)

(*) Notice: Subject to any disclaimer, the term of this patent is extended or adjusted under 35 U.S.C. 154(b) by 0 days.

(21) Appl. No.: 12/181,905

(22) Filed: Jul. 29, 2008

(65) Prior Publication Data
US 2008/0279497 A1    Nov. 13, 2008

Related U.S. Application Data

(62) Division of application No. 11/351,031, filed on Feb. 9, 2006, now Pat. No. 7,421,156.

(51) Int. Cl.
G02B 6/12    (2006.01)
G02B 6/00    (2006.01)
(52) U.S. Cl. .............................. 385/14; 385/4; 385/11; 385/15
(58) Field of Classification Search ........................ None
See application file for complete search history.

(56) References Cited

U.S. PATENT DOCUMENTS

| | | | |
|---|---|---|---|
| 6,222,974 B1 | 4/2001 | Nagata | |
| 6,240,221 B1 | 5/2001 | Thompson | |
| 6,243,517 B1 | 6/2001 | Deacon | |
| 6,278,168 B1 | 8/2001 | Day | |
| 6,885,795 B1 | 4/2005 | Hsu et al. | |
| 7,003,198 B2 | 2/2006 | Doerr | |
| 2004/0146247 A1* | 7/2004 | Tsai et al. | 385/40 |
| 2005/0013576 A1 | 1/2005 | Chhabra et al. | |
| 2005/0213887 A1 | 9/2005 | Balakrishnan et al. | |
| 2006/0126989 A1* | 6/2006 | Glebov | 385/11 |

* cited by examiner

Primary Examiner—Tina M Wong
(74) Attorney, Agent, or Firm—Turocy & Watson, LLP (57) ABSTRACT

Polarization dependent loss may be reduced by providing at least one dummy waveguide or at least one dummy metal structure. Polarization dependent loss may also be reduced by imposing a mechanical force on the OIC to exert mechanical stress thereby changing at least one of the birefringence and the optical axes of at least one waveguide. And polarization dependent loss may be reduced by forming a metal heater using a first set of metal deposition parameters; forming a conductive metal structure contacting the metal heater using a second set of metal deposition parameters; and selecting the first set of metal deposition parameters and the second set of metal deposition parameters to reduce stress.

20 Claims, 5 Drawing Sheets

METHODS TO REDUCE POLARIZATION DEPENDENT LOSS IN PLANAR LIGHTWAVE CIRCUITS

CROSS-REFERENCE TO RELATED APPLICATIONS

This application is a Division of and claims the benefit of priority to co-pending U.S. patent application Ser. No. 11/351,031, filed on Feb. 9, 2006, the entire contents of which are incorporated herein by reference.

TECHNICAL FIELD

The present invention generally relates to fabricating optical integrated circuits that exhibit reduced polarization dependent loss. In particular, the present invention relates to reducing stress within optical integrated circuits as a means to reduce polarization dependent loss.

BACKGROUND

As optical networks increasingly carry burgeoning Internet traffic, the need for advanced and efficient optical components rises. Optical communication systems permit the transmission of large quantities of information. Improved optical integrated circuits (OICs) are particularly needed. OICs come in many forms such as 1×N optical splitters, optical switches, wavelength division multiplexers (WDMs), demultiplexers, optical add/drop multiplexers (OADMs), and the like. Optical circuits allow branching, coupling, switching, separating, multiplexing and demultiplexing of optical signals without intermediate transformation between optical and electrical media.

Such optical circuits include planar lightwave circuits (PLCs) having optical waveguides on flat substrates, which can be used for routing optical signals from one of a number of input optical fibers to any one of a number of output optical fibers or optical circuitry. PLCs make it possible to achieve higher densities, greater production volume and more diverse functions than are available with fiber components through employment of manufacturing techniques typically associated with the semiconductor industry. For instance, PLCs contain optical paths known as waveguides formed on a silicon wafer substrate using lithographic processing, wherein the waveguides are made from transmissive media including lithium niobate ($LiNbO_3$) or other inorganic crystals, silica, glass, thermo-optic polymers, electro-optic polymers, and semiconductors such as indium phosphide (InP), which have a higher index of refraction than the chip substrate or the outlying cladding layers in order to guide light along the optical path. By using advanced photolithographic and other processes, PLCs are fashioned to integrate multiple components and functionalities into a single optical chip.

One important application of PLCs and OICs generally involves wavelength-division multiplexing (WDM) including dense wavelength-division multiplexing (DWDM). DWDM allows optical signals of different wavelengths, each carrying separate information, to be transmitted via a single optical channel or fiber in an optical network. In order to provide advanced multiplexing and demultiplexing (e.g., DWDM) and other functions in such networks, arrayed-waveguide gratings (AWGs) have been developed in the form of PLCs.

A problem with OICs is polarization dependence of the waveguides, typically caused by waveguide birefringence. Waveguide birefringence is experienced in varying degrees with waveguides fabricated from the above-mentioned materials. For example, where the waveguides are formed by depositing a glass film on a silicon substrate, the difference in thermal expansion coefficient between the glass film and the silicon substrate base causes stress applied on the waveguides in a direction parallel to the surface to be different from that in a perpendicular direction.

Waveguide birefringence results, wherein the refractive index of the waveguides in the direction parallel to the substrate surface becomes different from that in the perpendicular direction. The birefringence, in turn, causes polarization dependence in the waveguides, where the optical path length difference (e.g., between adjacent waveguides) changes depending on the polarizing direction of light. In this situation, shifts occur between the transverse electric (TE) and transverse magnetic (TM) mode peaks, where the shift changes according to polarization. Consequently, the device characteristics change in accordance with the polarized state of the light provided to the device. For instance, the peak coupling in a particular channel or waveguide can vary according to the polarities of the various wavelength components, causing polarization dependent wavelength shift.

The polarization state in an optical network is affected by many parameters including stress on an optical fiber or waveguide. The varying loss associated with changing polarization is called polarization dependent loss. In other words, polarization dependent loss is a measure of component sensitivity to state of polarization. Polarization dependent loss is measured by monitoring the change in insertion loss as the polarization is changed through all of the possible polarization states with a polarization controller. Polarization dependent loss is expressed as the difference between the maximum and minimum insertion loss. The difference in insertion loss for one polarization compared to another is expressed in dB. Polarization dependent loss in optical network components affects a system's performance, especially when there are many components in the system.

OICs may contain one or more couplers. A coupler is a device for coupling optical power between two waveguides. Couplers made of planar waveguides consist of deposited films and other structures that typically have unmatched coefficients of thermal expansion. As a result, stress is present in the device. Stress in coupler waveguides in close proximity can be one or more of anisotropic and asymmetric. For example, the inner edges of coupler waveguides show higher stress compared to the outer edges. The stress is one or more of tensile stress and compressive stress.

The stress affects the refractive index of the waveguides through the stress optic coefficients and leads to unwanted rotations of the optical axes in the couplers. The rotation of optical axes facilitates the coupling between polarizations within the same waveguide as well as between different waveguides in close proximity. Such polarization coupling may result in increased polarization dependent loss within the device.

In OICs with a plurality of optical devices, such as a plurality Mach-Zehnder devices, polarization dependent loss bow is exhibited. Polarization dependent loss bow occurs when the end/edge channels of an array exhibit low polarization dependent loss, and polarization dependent loss increases as the middle/central channel is approached. This may be due to excessive etch loading on the end channels during their formation. Although it is generally desirable to reduce polarization dependent loss, an asymmetric occurrence of polarization dependent loss may be undesirable.

OICs contain metal lines, metal heaters, metal interconnects, and other metal films on top of the top cladding. These metal structures are required for the operation of the OICs. However, the metal structures on top of the top cladding often induce stress in the underlying waveguides. When the stress is asymmetric, birefringence is induced undesirably rotating the optical axes.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter. The present invention provides OICs and methods for reducing polarization dependent loss in OICs and OICs exhibiting reduced polarization dependent loss. Generally speaking, the present invention provides a number of avenues for reducing and/or more evenly distributing stress within OICs thereby reducing polarization dependent loss.

One aspect of the invention relates to a method of reducing polarization dependent loss in an OIC by providing at least one dummy waveguide structure proximate an operable waveguide or at least one dummy metal structure proximate an operable metal structure to reduce and/or more evenly distribute stress within the OIC.

Another aspect of the invention relates to a method of reducing polarization dependent loss in an OIC by forming an OIC comprising a substrate and at least one waveguide having a first birefringence and a first optical axes; and imposing a mechanical force on the OIC to exert mechanical stress thereby changing at least one of the first birefringence and the first optical axes of the at least one waveguide to a second birefringence and a second optical axes.

Yet another aspect of the invention relates to a method of reducing polarization dependent loss in an OIC by forming a metal heater proximate at least one waveguide using a first set of metal deposition parameters; forming a conductive metal structure contacting the metal heater using a second set of metal deposition parameters; and selecting the first set of metal deposition parameters and the second set of metal deposition parameters to reduce metal stress between the conductive metal structure and the metal heater.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION

The present invention provides avenues for reducing polarization dependent loss in OICs by tailoring and/or controlling stress. Stress and polarization dependent loss in OICs can be mitigated by positioning dummy waveguide structures proximate operable waveguides functioning as couplers; by positioning dummy waveguide structures proximate operable end waveguide channels; by positioning dummy metal structures proximate operable metal structures; by maximizing the symmetry of metal structures relative to the operable waveguides; by applying mechanical stress to the OIC/waveguides; and/or by controlling the metal deposition conditions to regulate stress between adjacent metal structures.

Since stress on operable waveguides causes birefringence resulting in polarization dependent loss, reducing the stress and/or making the stress uniform upon substantially all portions of a waveguide and/or upon all waveguides in a given OIC, reduces polarization dependent loss in the OICs containing the waveguides.

The OICs of the present invention contain at least one waveguide. The OICs may be or contain AWGs, wavelength splitters, taps, couplers, Mach Zehnders, variable optical attenuators (VOAs), and integrated devices containing two or more thereof. The OICs are made, at least in part, with materials such as silica, monocrystalline silicon, InP, thermo-optic polymers, electro-optic polymers, $LiNbO_3$, silicon oxynitride, silicate glasses, and the like. Examples of silicate glasses include phosphosilicate glass (PSG), fluorosilicate glass (FSG), borophosphosilicate glass (BPSG), germanium borophosphosilicate glass (GBPSG), germanium, germanium phosphosilicate, and germanium posophosphosilicate.

The OICs are typically made by forming a bottom cladding layer on a substrate; depositing and patterning a core layer thereover forming at least one waveguide; forming a top cladding layer over the waveguides; and forming heaters and other metal structures over the top cladding layer.

In one embodiment, the present invention involves reducing polarization dependent loss in an OIC by providing at least one dummy waveguide structure proximate an operable waveguide to reduce stress within the optical integrated circuit. The dummy or inoperable waveguide structure, which is made of the same or similar material as the operable waveguides, may have shape a shape similar to an operable waveguide, or it may have a random shape. In this connection, the dummy waveguide structure may have a cross-sectional area approximately equal (typically about 2 µm or more and about 10 µm or less in diameter) to operable waveguides, or the dummy waveguide structure may have a square, rectangular, circular, oval, or other geometric structure.

While not wishing to be bound by any theory, it is believed that the dummy waveguide structure contributes to symmetric stress distribution on the operable waveguides within an OIC. Alternatively or additionally, it is believed that forming the dummy waveguide structure at the time of forming the operable waveguides contributes to more even distribution of the etch loading of end/edge channels, thereby reducing polarization dependent loss bow across an OIC.

Referring to FIGS. 1-5 various examples of providing at least one dummy waveguide structure proximate an operable waveguide are shown. In each Figure, only the relevant portion of an OIC is shown.

Figure 1:
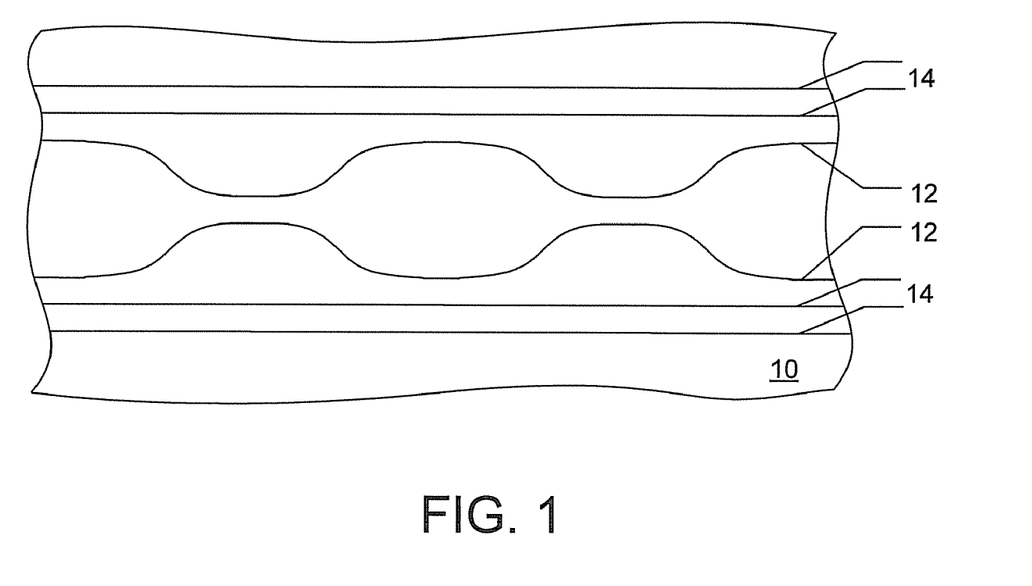
FIG. 1 illustrates a top-down view of an OIC with a plurality of waveguide structures in accordance with one aspect of the present invention.

Referring to FIG. 1, a top down view of a portion of an OIC is shown. On substrate 10 are positioned at least one operable waveguide 12 and at least one dummy waveguide structure 14. The operable waveguides may form a portion of one or more Mach Zehnders. Dummy waveguides 14 are positioned near the operable waveguides 12, and particularly at least a portion of the dummy waveguides 14 are positioned near at least a portion of the operable waveguides 12. Near or proximate means that a portion of the dummy waveguides 14 are positioned within about 500 µm or less (or within about 250 µm or less or even within about 100 µm or less) of the operable waveguides 12.

Dummy waveguide structures 14 are in the shape of operable waveguides, but they do not mimic the same layout as the operable waveguides 12, although they may be positioned in such a manner (not shown). Dummy waveguide structures 14 may or may not be near the coupling regions of operable waveguides 12.

Dummy waveguides 14 may be positioned on one side of operable waveguides 12, or on both sides as shown in FIG. 1. Especially in embodiments where the operable waveguides form a plurality of Mach Zehnders, the dummy waveguides 14 are positioned proximate the edge channels.

Figure 2:
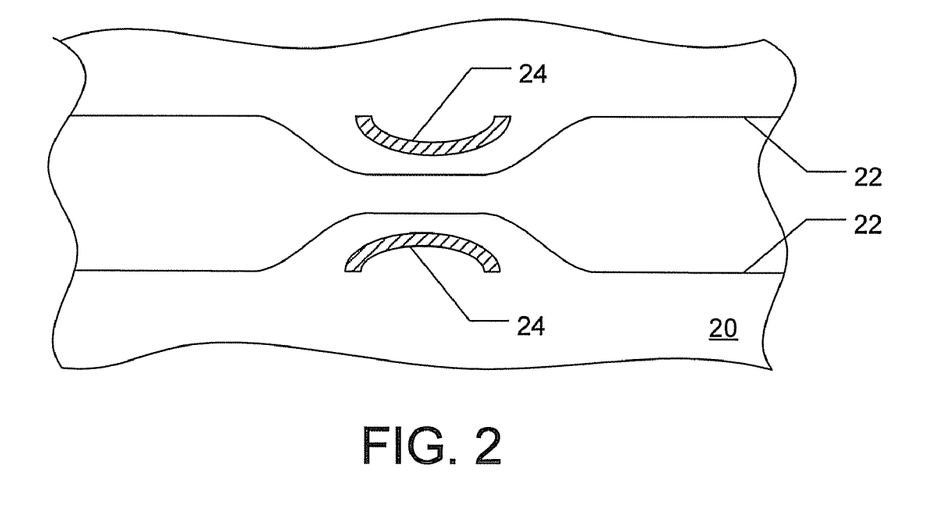
FIG. 2 illustrates a top-down view of an OIC with a plurality of waveguide structures in accordance with another aspect of the present invention.

Referring to FIG. 2, a top down view of a portion of an OIC is shown. On substrate 20 are positioned at least one operable waveguide 22 and at least one dummy waveguide structure 24. Dummy waveguide structures 24 are not in the shape of operable waveguides, but they do mimic a portion of the layout of the operable waveguides 22, in the coupling region. Dummy waveguide structures 24 are provided on the OIC in the coupling region, where reducing polarization dependent loss is particularly desirable.

Dummy waveguide structures 24 are positioned near at least a portion of the operable waveguides 22 (within about 500 µm or less of the operable waveguides 22). By positioning the dummy waveguide structures 24 near the coupling region of the operable waveguides 22, stress on the operable waveguides in the coupling region is mitigated.

Figure 3:
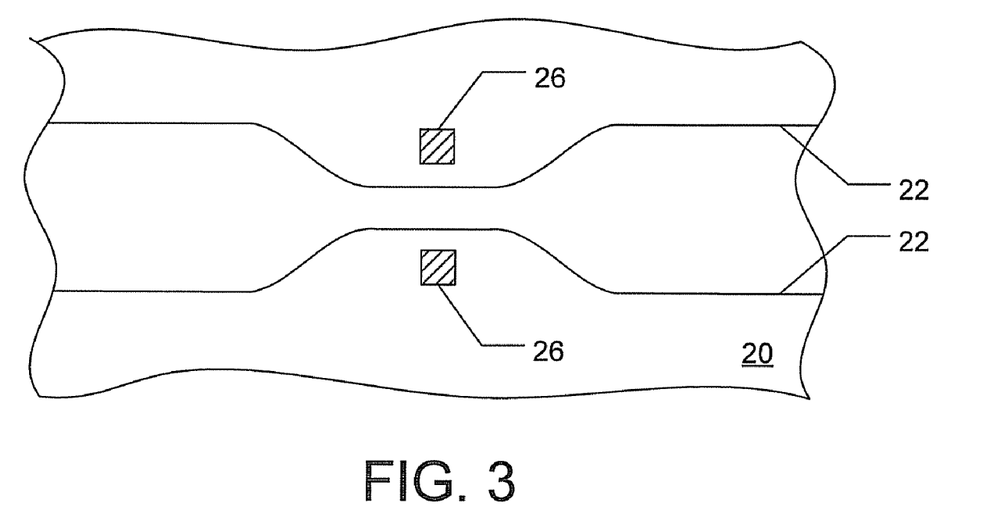
FIG. 3 illustrates a top-down view of an OIC with a plurality of waveguide structures in accordance with another aspect of the present invention.

Referring to FIG. 3, a top down view of a portion of an OIC is shown. On substrate 20 are positioned at least one operable waveguide 22 and at least one dummy waveguide structure 26. Dummy waveguide structures 26 are not in the shape of operable waveguides, but they do mimic a portion of the layout of the operable waveguides 22, in the coupling region. Dummy waveguide structures 26 in this embodiment have a rectangular shape.

Dummy waveguide structures 26 are positioned near at least a portion of the operable waveguides 22 (within about 500 µm or less of the operable waveguides 22). By positioning the dummy waveguide structures 26 near the coupling region of the operable waveguides 22, stress on the operable waveguides in the coupling region is mitigated.

Figure 4:
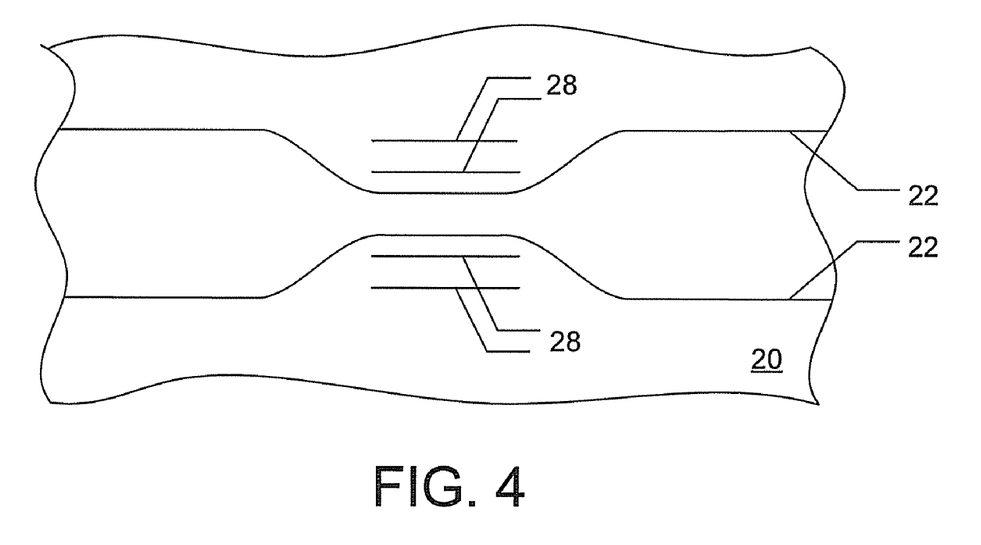
FIG. 4 illustrates a top-down view of an OIC with a plurality of waveguide structures in accordance with another aspect of the present invention.

Referring to FIG. 4, a top down view of a portion of an OIC is shown. On substrate 20 are positioned at least one operable waveguide 22 and at least one dummy waveguide structure 28. Dummy waveguide structures 28 are not in the shape of operable waveguides, but they do mimic a portion of the layout of the operable waveguides 22, in the coupling region. Dummy waveguide structures 28 in this embodiment have the shape of an operable waveguide, but they do not extend across the OIC nor along the entire operable waveguide 22. As shown, two or more dummy waveguide structures 28 may be positioned proximate an operable waveguide 22.

Dummy waveguide structures 28 are positioned near at least a portion of the operable waveguides 22 (within about 500 µm or less of the operable waveguides 22). By positioning the dummy waveguide structures 28 near the coupling region of the operable waveguides 22, stress on the operable waveguides in the coupling region is mitigated.

Figure 5:
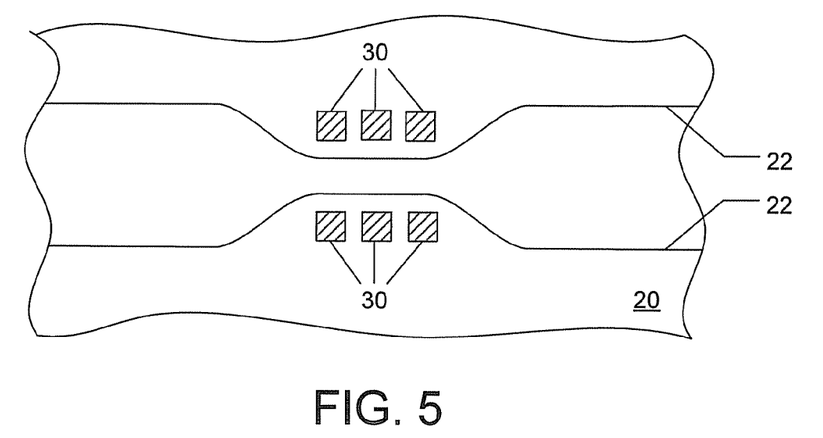
FIG. 5 illustrates a top-down view of an OIC with a plurality of waveguide structures in accordance with another aspect of the present invention.

Referring to FIG. 5, a top down view of a portion of an OIC is shown. On substrate 20 are positioned at least one operable waveguide 22 and at least one dummy waveguide structure 30. Dummy waveguide structures 30 are not in the shape of operable waveguides, but they do mimic a portion of the layout of the operable waveguides 22, in the coupling region. Dummy waveguide structures 30 in this embodiment have a square shape. As shown, three or more dummy waveguide structures 28 may be positioned proximate an operable waveguide 22.

Dummy waveguide structures 30 are positioned near at least a portion of the operable waveguides 22 (within about 500 µm or less of the operable waveguides 22). By positioning the dummy waveguide structures 30 near the coupling region of the operable waveguides 22, stress on the operable waveguides in the coupling region is mitigated.

The dummy waveguide structures in FIG. 1-5 may be made in the substantially same manner as the operable waveguides. A core layer containing a material suitable to function as a waveguide in an OIC is formed over a bottom clad layer, which is turn formed over a substrate. The core layer is patterned, typically using lithographic techniques. Patterning the core layer provides operable waveguides as well as the dummy waveguide structures. A top clad layer is formed over the operable waveguides and the dummy waveguide structures, and additional layers/structures are formed thereover. When formed in this manner, the dummy waveguide structures have the same or substantially the same thickness as the operable waveguides.

The dummy waveguide structures are made of the same or similar material as the operable waveguides. It can be advantageous to provide dummy waveguide structures with the same material as the operable waveguides in order to match or make similar the coefficient of expansion and other physical properties. Generally speaking, the coefficient of expansion and other physical properties of the operable waveguides and the dummy waveguide structures are within about 20% of each other.

The specific shape or pattern of the dummy waveguide structures may vary, as several specific different examples are shown in FIGS. 1-5. Additional shapes and patterns may be employed by those skilled in the art. The selection of a specific shape/pattern for a specific OIC can be made by one skilled in the art after considering stress and polarization dependent loss in the OIC without the dummy waveguide structures.

In another embodiment, the present invention involves reducing polarization dependent loss in an OIC by providing at least one dummy metal structure proximate an operable metal structure to reduce stress within the optical integrated circuit. Alternatively, dummy metal structures are provided on an OIC so that a generally symmetrical metal layout (relative to the entire OIC or relative to one or all waveguides) may be obtained. By positioning at least one dummy metal structure near an operable metal structure, the stress associated with different coefficients of expansion (or other physical properties) between metal, the waveguides, and cladding material are mitigated and/or more evenly distributed throughout the OIC.

Figure 6:
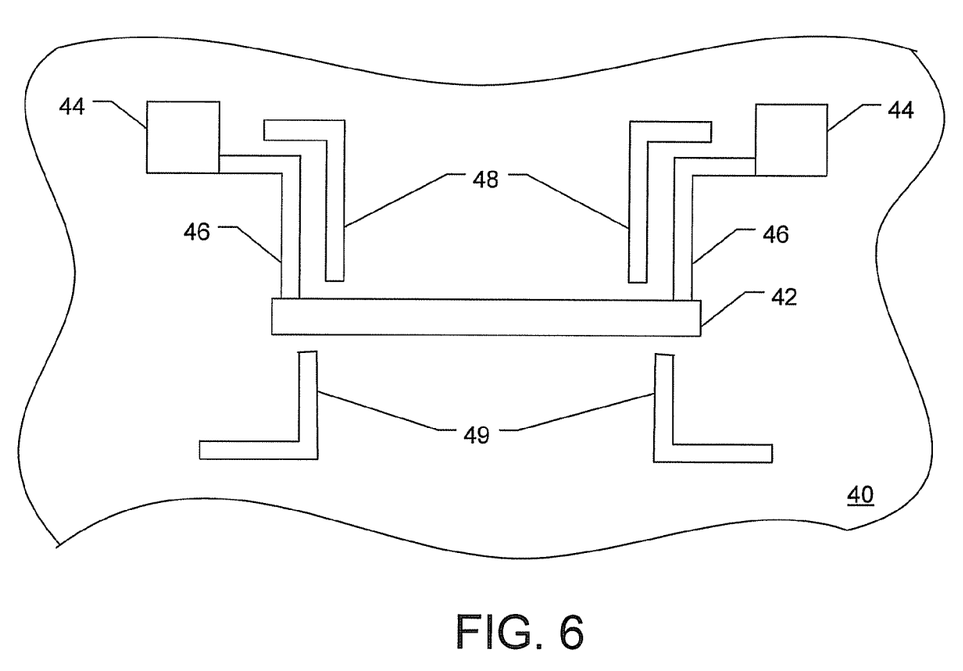
FIG. 6 illustrates a top-down view of an OIC with a plurality of metal structures in accordance with one aspect of the present invention.

Referring to FIG. 6, a top-down view of an OIC with a plurality of metal structures is shown in accordance with one aspect of the present invention (waveguides not shown as they exist within the OIC at a level below the metal structures). On substrate 40 are positioned at least one operable metal structure, the operable metal structures in this embodiment shown are metal heater 42, metal contact 44, and metal interconnect 46, and at least one dummy metal structure 48. Dummy metal structures 48 are positioned near the operable metal structures 42, 44, and 46 and particularly at least a portion of the dummy metal structures 48 are positioned near at least a portion of the operable metal structures 42, 44, and 46. As stated earlier, near or proximate means about 500 µm or less (or within about 250 µm or less or even within about 100 µm or less).

In this embodiment, the metal heater 42 is typically made of a resistive or refractory metal, such as chromium, nickel, tantalum, titanium, tungsten, titanium-tungsten, vanadium, and mixtures and alloys thereof. Also in this embodiment, the metal contact 44 and metal interconnect 46 are typically made of a conductive metals, such as aluminum, copper, silver, gold, and mixtures and alloys thereof. Thus, the dummy metal structure 48 may be made of resistive metals, refractory metals, and/or conductive metals.

Dummy metal structures 48 are in the shape of operable metal structures, the metal interconnects 46 in particular in this embodiment, but they do not mimic the same layout as all the operable metal structures, although they may be positioned in such a manner (not shown). Dummy metal structures 48 may have any shape that reduces stress within the OIC. Dummy metal structures 48 may or may not be near the coupling regions of an OIC. Dummy metal structures 48 may be positioned on one side of an operable metal structure, or on both sides.

Often, metal heaters are positioned directly over a waveguide, Mach Zehnder, coupler, or the like in a layer above the waveguides. Dummy metal structures near operative metal heaters are positioned to impart some symmetry to the overall metal layout on an OIC. As a result, stress due to different coefficients of expansion between metal structures (both operable and dummy) and other OIC materials is more evenly distributed within the OIC and/or about one or more waveguides in the OIC.

The dummy metal structures may be made in the substantially same manner as the operable metal structures. After a top clad layer is formed over one or more waveguides, a metal layer containing one or more suitable metals to function as a heater, interconnect, contact, conductor, and the like is formed thereover. The metal layer is patterned, typically using lithographic techniques. Patterning the metal layer provides operable metal structures as well as the dummy metal structures (typically not connected to other metal structures). When formed in this manner, the dummy metal structures have the same or substantially the same thickness as the operable metal structures.

The dummy metal structures are made of the same or similar material as the operable metal structures. It can be advantageous to provide dummy metal structures with the same material as the operable metal structures in order to match or make similar the coefficient of expansion and other physical properties. Generally speaking, the coefficient of expansion and other physical properties of the operable metal structures and the dummy metal structures are within about 20% of each other.

In the event two or more different types of metals are patterned on the OIC in two different sets of deposition/patterning steps, the dummy metal structures may be formed with one or more of the first set of metal structures, the second set of metal structures, the third set of metal structures and so on.

The specific shape or pattern of the dummy metal structures may vary from that shown in FIG. 6. Additional shapes and patterns may be employed by those skilled in the art. The selection of a specific shape/pattern for a specific OIC can be made by one skilled in the art after considering stress and polarization dependent loss in the OIC without the dummy metal structures.

In yet another embodiment, the present invention involves reducing polarization dependent loss in an OIC by imposing a mechanical force on the OIC to exert mechanical stress thereby changing at least one of the birefringence and optical axes of the waveguide(s) in the OIC.

Figure 7:
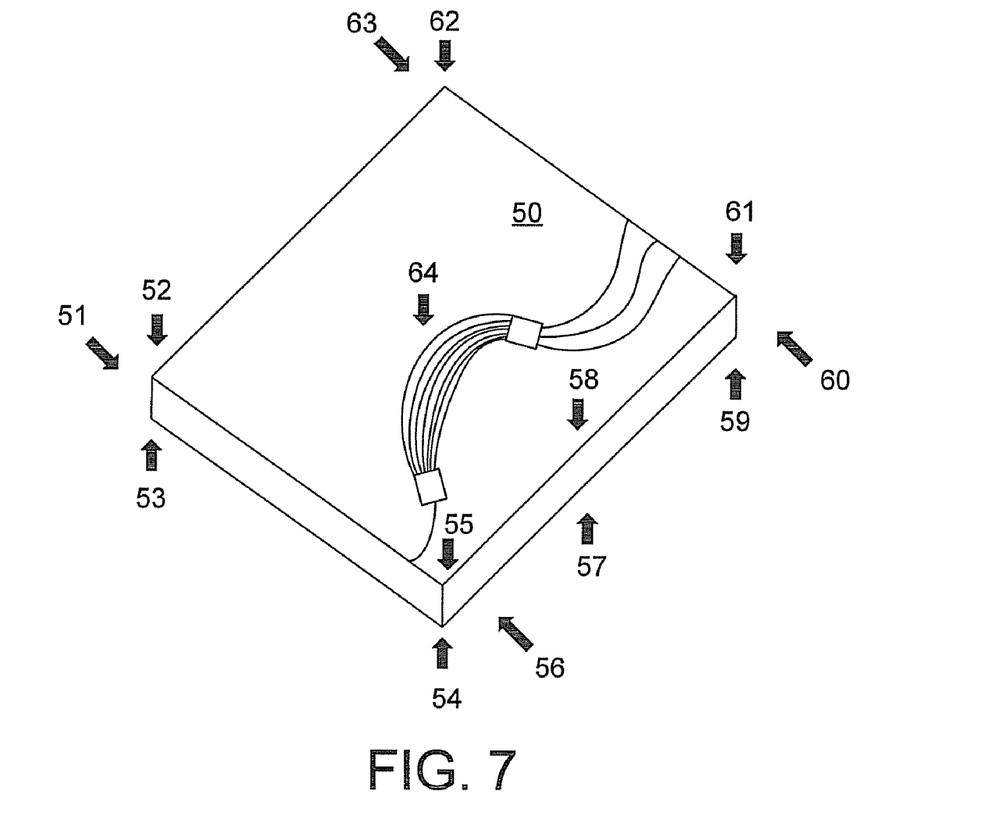
FIG. 7 illustrates a perspective view of an OIC in relation to various forces in accordance with one aspect of the present invention.

In a first aspect, the mechanical force is imposed by bending the optical integrated circuit. Referring to FIG. 7, a top down view of a portion of an OIC 50 is shown. In the OIC 50 are a plurality of operable waveguides (not numbered) forming an arrayed waveguide. An external mechanical force is imposed on the OIC 50 along any number (one or more) of the black arrows 51-64, for example, which in turn imposes mechanical stress on at least one waveguide, thereby changing at least one of the birefringence and optical axes of the waveguide(s) in the OIC 50. Forces from other angles may additionally or alternatively be imposed.

The stress is imposed by securing or holding the OIC with any suitable device and applying a force to the OIC at the location where held or at a different location(s) using another device. For example, the OIC 50 may be held at point 64, and forces may be applied along arrows 51 and 60 to impose mechanical stress on the waveguides. Numerous combinations of holding positions and force positions may be employed, and such can be determined by one skilled in the art.

A suitable force is applied to sufficiently bend the OIC so that at least one of the birefringence and optical axes of waveguide(s) in the OIC are changed to reduce polarization dependent loss. The force applied depends on the size of the OIC, the materials that make up the OIC particularly including the waveguide material, the thickness of the substrate, and the like.

In one embodiment, the force applied to sufficiently bend the OIC is about 100 MPa or more. In another embodiment, the force applied to sufficiently bend the OIC is about 150 MPa or more.

In a second aspect, the optical integrated circuit is adjacent a riser, and the mechanical force is imposed by providing a riser with a first thermal expansion coefficient and the OIC substrate has a second thermal expansion coefficient. The difference in thermal expansion coefficients imposes mechanical stress upon the OIC, which causes changes in at least one of the birefringence and optical axes of waveguide(s) in the OIC. The intentional mismatch of thermal expansion coefficients is thus an efficient manner to impose mechanical stress on an OIC. Additionally or alternatively, an adhesive that is optionally employed between the riser and OIC substrate can be selected based upon its thermal expansion coefficient, or mismatch thereof relative to the OIC.

Figure 8:
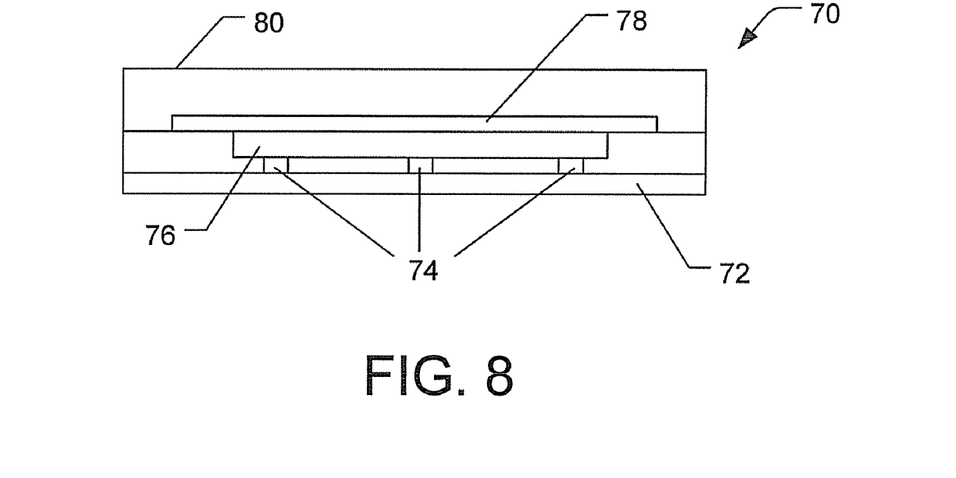
FIG. 8 illustrates a cross-sectional view of an OIC package in accordance with one aspect of the present invention.

Referring to FIG. 8, a cross-sectional view of an OIC package 70 is shown. The OIC package contains a base 72, spacers 74, a riser 76, and an OIC 78 over and in contact with the riser 76, and a cover 80. Since the OIC 78 and the riser 76 are adjacent each other, differences in thermal expansion coefficients between the OIC 78 (and particularly the bottom or substrate of the OIC 76) and the riser 76 imposes mechanical stress upon the OIC, and thus upon waveguides (not shown) contained in the OIC 76.

In a third aspect, the mechanical force is imposed by depositing metal on top of the OIC. The metal has a first thermal expansion coefficient and the OIC has a second thermal expansion coefficient. The difference in thermal expansion coefficients imposes mechanical stress upon the OIC, which causes changes in at least one of the birefringence and optical axes of waveguide(s) in the OIC.

Figure 9:
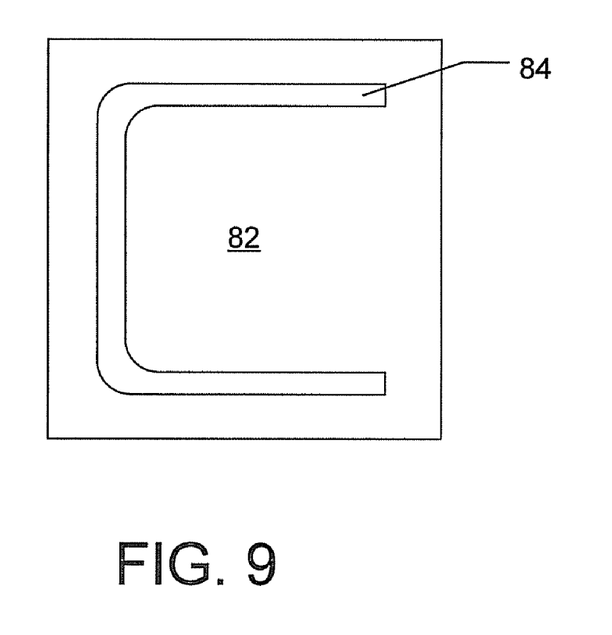
FIG. 9 illustrates a top-down view of an OIC with a metal structure in accordance with one aspect of the present invention.

Referring to FIG. 9, a top-down view of an OIC with a metal structure is shown (waveguides not shown as they exist within the OIC at a level below the metal structures). On substrate 82 is positioned at least one metal structure 84. The metal structure 84 may be made of resistive metals, refractory metals, and/or conductive metals; namely, chromium, nickel, tantalum, titanium, tungsten, titanium-tungsten, vanadium, aluminum, copper, silver, gold, and mixtures and alloys thereof.

The metal structure(s) 84 may be made in the substantially same manner as other metal structures in the OIC. After forming the OIC, a metal layer is formed thereover. The metal layer is then optionally patterned, typically using lithographic techniques.

The metal structure(s) 84 may have any shape and thickness that imposes a mechanical force on the OIC. The specific shape or pattern of the metal structure 84 may and will vary from that shown in FIG. 9. Additional shapes and patterns may be employed by those skilled in the art. The selection of a specific shape/pattern for a specific OIC can be made by one skilled in the art after considering stress and polarization dependent loss in the OIC without the metal structure.

In a fourth aspect, the optical integrated circuit comprises silicon dioxide on its backside, and the mechanical force is imposed by removing a portion of the silicon dioxide. Generally speaking, OICs are fabricated on silicon or silica substrates, mainly due to the balance in maximizing both cost and performance considerations. In this aspect of the invention, the OIC substrate is thinned, on the backside, to impose a mechanical force on the waveguides (compared to the OIC without the thinned substrate) causing changes in at least one of the birefringence and optical axes of waveguides.

The different materials that make up an OIC each have different thermal expansion coefficients. The waveguides have a first thermal expansion coefficient and the OIC substrate (unthinned) has a second thermal expansion coefficient. Thinning the backside of the OIC substrate provides the OIC substrate with a third thermal expansion coefficient, which imposes a mechanical force on the waveguides compared to the unthinned OIC substrate. The amount of thinning is that which is suitable to provide the OIC substrate with a different thermal expansion coefficient (different from the unthinned OIC substrate), and which imposes a mechanical force on the waveguides to cause changes in at least one of the birefringence and optical axes. It is not necessary to uniformly thin the backside of the OIC substrate.

In one embodiment, about 1 μm or more and about 10,000 μm or less in thickness is removed from the backside of the OIC substrate. In another embodiment, about 10 μm or more and about 5,000 μm or less in thickness is removed from the backside of the OIC substrate. The OIC substrate may be thinned in any suitable manner including liquid etching, plasma etching, chemical mechanical polishing, and precision grinding.

In still yet another embodiment, the present invention involves reducing polarization dependent loss in an OIC by selecting metal deposition parameters of a metal heater and metal deposition parameters a conductive metal structure contacting the metal heater to reduce metal stress where the conductive metal structure contacts the metal heater. When two metal layers or structures are formed adjacent each other, the difference in thermal expansion coefficients can vary depending on the manner in which the metal structures are formed. In particular, varying the deposition parameters of a metal structure leads to differences in the thermal expansion coefficients of subsequently formed metal structures.

Figure 10:
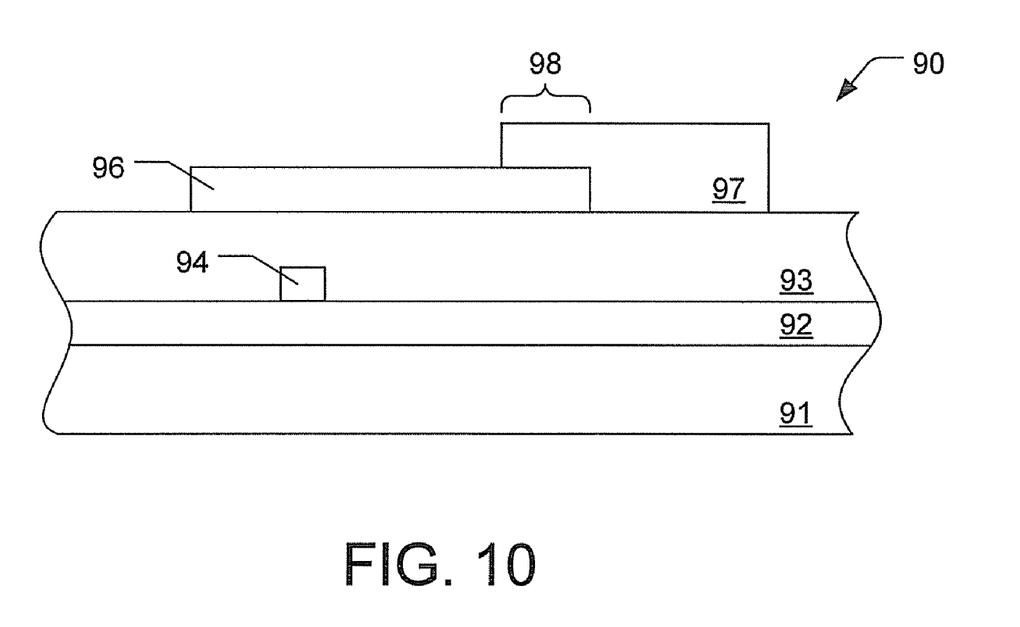
FIG. 10 illustrates a cross-sectional view of an OIC in accordance with another aspect of the present invention.

Referring to FIG. 10, a cross-sectional view of an OIC 90 with metal structures is shown. OIC 90 has substrate 91, bottom clad layer 92, top clad layer 93, waveguide 94, metal heater 96, and metal interconnect 97. Metal heater 96 and metal interconnect contact each other in edge region 98. Edge region 98 where the metal heater 96 and metal interconnect 97 interface is one source of stress within the OIC 90. Reducing this stress can reduce polarization dependent loss in nearby waveguide 94. The amount, if any, of edge region 98 can be varied to modulate the stress between the metal heater 96 and metal interconnect 97, and thus, modulate the overall stress of the entire OIC 90.

In OIC fabrication, metal structures are formed, in part, by initially depositing a metal (or metals, or alloys) on the target substrate by electroplating, evaporation, chemical vapor deposition (CVD), physical vapor deposition (PVD) or sputtering. Parameters that can be varied in these deposition processes include one or more of pressure, temperature, power, atmosphere composition, time, concentration of metals (when forming an alloy layer), and the like. Selection of specific values of each of the applicable parameters depends upon the identity of the metal(s) being deposited, the desired thickness, and the identity of metal(s) that may be subsequently deposited adjacent thereto.

Such specific values can be determined by one skilled in the art, especially in view of stress formulae. The stress formula takes into account the stresses associated with depositing specific metals under specific conditions. These stresses are known to those skilled in the art, or can be readily determined by those skilled in the art. The combined metal stress can be calculated using Formula (I):

$$\sigma_{om} = \frac{(\sigma_{m1} \times t_{m1}) + (\sigma_{m2} \times t_{m2})}{t_{m1} - t_{m2}} \qquad (I)$$

wherein $\sigma_{om}$ is the combined overall metal stress, $\sigma_{m1}$, is the metal stress of the first metal(s) deposited (such as the heater), $\sigma_{m2}$ is the metal stress of the second metal(s) deposited (such as the interconnect), $t_{m1}$ is the thickness of the first metal(s) deposited, and $t_{m2}$ is the thickness of the second metal(s) deposited. And the overall OIC or wafer stress can be calculated using Formula (II):

$$\sigma_{ow} = \frac{(\sigma_{TC} \times \sigma_{TC}) + (\sigma_{om} \times t_{om})}{t_{TC} - t_{om}} \qquad (II)$$

wherein $\sigma_{ow}$ is the effective overall OIC or wafer stress, $\sigma_{TC}$ is the stress of the top clad layer, $t_{TC}$ is the thickness of the top clad layer, and $t_{om}$ is the average thickness of the metal layers.

In one embodiment, the present invention enables reducing polarization dependent loss in an OIC by about 0.05 dB or more. In another embodiment, the present invention enables reducing polarization dependent loss in an OIC by about 0.1 dB or more. In another embodiment, the present invention enables reducing polarization dependent loss in an OIC by about 0.15 dB or more.

In one embodiment, the present invention enables reducing polarization dependent loss by about 5% or more in an OIC. In another embodiment, the present invention enables reducing polarization dependent loss by about 10% or more in an OIC. In yet another embodiment, the present invention enables reducing polarization dependent loss by about 20% or more in an OIC.

Although the invention has been shown and described with respect to certain illustrated implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", "with", "has", "having", and variants thereof are used in either the detailed description or the claims, these terms are intended to be inclusive in a manner similar to the term "comprising."

What is claimed is:

1. A method of reducing polarization dependent loss in an optical integrated circuit, comprising:
    forming an optical integrated circuit comprising a substrate and at least one waveguide having a first birefringence and a first optical axes; and
    imposing a mechanical force on the optical integrated circuit to exert mechanical stress thereby changing at least one of the first birefringence and the first optical axes of the at least one waveguide to a second birefringence and a second optical axes,
    wherein the optical integrated circuit comprises silicon dioxide on its backside, and the mechanical force is imposed by removing a portion of the silicon dioxide.

2. The method according to claim 1, wherein the at least one waveguide forms a portion of a coupler.

3. The method according to claim 1, wherein the optical integrated circuit has a polarization dependent loss reduced by about 20% or more compared to a similar optical integrated circuit not having a mechanical force imposed thereon.

4. The method according to claim 1, wherein the optical integrated circuit has a polarization dependent loss reduced by about 0.15 dB or more compared to a similar optical integrated circuit not having a mechanical force imposed thereon.

5. The method according to claim 1, wherein the optical integrated circuit is adjacent a riser, and the mechanical force is further imposed by providing the riser with a first thermal expansion coefficient and the substrate has a second thermal expansion coefficient.

6. The method according to claim 1, wherein the mechanical force is imposed at about 100 MPa or more.

7. The method according to claim 1, wherein the optical integrated circuit having at least one of the second birefringence and the second optical axes has a polarization dependent loss reduced by about 10% or more compared to the optical integrated circuit having at least one of the first birefringence and the first optical axes.

8. The method according to claim 1, wherein the optical integrated circuit having at least one of the second birefringence and the second optical axes has a polarization dependent loss reduced by about 0.1 dB or more compared to the optical integrated circuit having at least one of the first birefringence and the first optical axes.

9. The optical integrated circuit made in accordance with the method of claim 1.

10. A method of reducing polarization dependent loss in an optical integrated circuit, comprising:
    forming an optical integrated circuit comprising a substrate and at least one waveguide having a first birefringence and a first optical axes; and
    imposing a mechanical force on the optical integrated circuit to exert mechanical stress thereby changing at least one of the first birefringence and the first optical axes of the at least one waveguide to a second birefringence and a second optical axes, wherein the mechanical force is imposed by depositing metal on top of the optical integrated circuit.

11. The method according to claim 10, wherein the optical integrated circuit has a polarization dependent loss reduced by about 0.15 dB or more compared to a similar optical integrated circuit not having a mechanical force imposed thereon.

12. A method of reducing polarization dependent loss in an optical integrated circuit, comprising:
    forming an optical integrated circuit comprising a substrate and at least one waveguide having a first birefringence and a first optical axes; and
    imposing a mechanical force of about 150 MPa or more on the optical integrated circuit to exert mechanical stress thereby changing at least one of the first birefringence and the first optical axes of the at least one waveguide to a second birefringence and a second optical axes,
    wherein the mechanical force is imposed by depositing metal on top of the optical integrated circuit.

13. The method according to claim 12, wherein the mechanical force is further imposed by bending the optical integrated circuit.

14. The method according to claim 12, wherein the optical integrated circuit is adjacent a riser, and the mechanical force is further imposed by providing the riser with a first thermal expansion coefficient and the substrate has a second thermal expansion coefficient.

15. The method according to claim 12, wherein the optical integrated circuit is planar lightwave circuit.

16. The method according to claim 12, wherein the optical integrated circuit having at least one of the second birefringence and the second optical axes has a polarization dependent loss reduced by about 10% or more compared to the optical integrated circuit having at least one of the first birefringence and the first optical axes.

17. The method according to claim 12, wherein the optical integrated circuit having at least one of the second birefringence and the second optical axes has a polarization dependent loss reduced by about 0.1 dB or more compared to the optical integrated circuit having at least one of the first birefringence and the first optical axes.

18. The optical integrated circuit made in accordance with the method of claim 12.

19. A method of reducing polarization dependent loss in an optical integrated circuit, comprising:
   forming an optical integrated circuit comprising a substrate and at least one waveguide having a first birefringence and a first optical axes; and
   imposing a mechanical force of about 150 MPa or more on the optical integrated circuit to exert mechanical stress thereby changing at least one of the first birefringence and the first optical axes of the at least one waveguide to a second birefringence and a second optical axes,
   wherein the optical integrated circuit comprises silicon dioxide on its backside, and the mechanical force is imposed by removing a portion of the silicon dioxide.

20. The method according to claim 19, wherein the optical integrated circuit having at least one of the second birefringence and the second optical axes has a polarization dependent loss reduced by about 10% or more compared to the optical integrated circuit having at least one of the first birefringence and the first optical axes.

\* \* \* \* \*

UNITED STATES PATENT AND TRADEMARK OFFICE
CERTIFICATE OF CORRECTION

PATENT NO. : 7,577,324 B2
APPLICATION NO. : 12/181905
DATED : August 18, 2009
INVENTOR(S) : Liu et al.

Page 1 of 1

It is certified that error appears in the above-identified patent and that said Letters Patent is hereby corrected as shown below:

The error occurs in the patent on the Title page, item (73) Assignee: NeoPhotonics Corporation, San Jose, CA (US)

It should read:

(73) Assignee: Lightwave Microsystems Corporation, San Jose, CA (US)

Signed and Sealed this

Tenth Day of August, 2010

David J. Kappos
*Director of the United States Patent and Trademark Office*